(12) United States Patent
Hardin et al.

(10) Patent No.: US 8,511,368 B2
(45) Date of Patent: Aug. 20, 2013

(54) GEOTHERMAL HEAT EXCHANGER

(76) Inventors: James Hardin, Greenwood, IN (US); Changchun Zhang, Columbus, IN (US)

( * ) Notice: Subject to any disclaimer, the term of this patent is extended or adjusted under 35 U.S.C. 154(b) by 1350 days.

(21) Appl. No.: 12/126,868

(22) Filed: May 24, 2008

(65) Prior Publication Data
US 2008/0289795 A1 Nov. 27, 2008

Related U.S. Application Data

(60) Provisional application No. 60/931,737, filed on May 25, 2007.

(51) Int. Cl.
*F24J 3/08* (2006.01)
*E21B 33/13* (2006.01)

(52) U.S. Cl.
USPC .............................. 165/45; 62/260; 138/115

(58) Field of Classification Search
CPC .................................... E21B 33/13; F24J 3/08
USPC ..................... 165/45, 155, 178; 138/92, 115; 166/242.1, 242.3; 62/260; 405/146, 147
See application file for complete search history.

(56) References Cited

U.S. PATENT DOCUMENTS

| | | | | |
|---|---|---|---|---|
| 1,835,323 A * | 12/1931 | Olson et al. | ................ | 165/103 |
| 3,958,637 A | 5/1976 | Cobbs | | |
| 4,655,280 A * | 4/1987 | Takahashi | ................ | 165/47 |
| 4,714,108 A | 12/1987 | Barry | | |
| 4,909,323 A * | 3/1990 | Hastings | ................ | 166/242.3 |
| 5,590,715 A * | 1/1997 | Amerman | ................ | 166/290 |
| 5,630,447 A | 5/1997 | Jensen | | |
| 5,651,251 A | 7/1997 | Hardin | | |
| 5,727,621 A | 3/1998 | Hardin | | |
| 5,791,378 A * | 8/1998 | Stephens | ................ | 138/98 |
| 6,000,459 A | 12/1999 | Jeppesen | | |
| 6,035,949 A | 3/2000 | Altschuler et al. | | |
| 6,053,239 A | 4/2000 | Hardin | | |
| 6,454,010 B1 | 9/2002 | Thomas et al. | | |
| 6,789,608 B1 * | 9/2004 | Wiggs | ................ | 165/45 |
| 7,213,649 B2 | 5/2007 | McNair et al. | | |

OTHER PUBLICATIONS

Description of prior art in Specification of instant application of Figs. 103, and paragraphs [0001]- [0036].
Sep. 2, 2008, Search Report and Reasoned Statement; International Searching Authority (US) for PCT/US2008/064808.

* cited by examiner

*Primary Examiner* — Tho V Duong
(74) *Attorney, Agent, or Firm* — E. Victor Indiano; Indiano Law Group, LLC

(57) ABSTRACT

A pipe for use in a geothermal heat exchange system is disclosed that is insertable into a bore hole having a proximal end and a distal end. The pipe has a proximal end, a distal end and an outer wall member. The outer wall member includes an external surface, and an interior surface defining an interior passageway through which a heat exchange fluid can flow. The pipe also includes a divider extending between opposed points of the interior surface for dividing the interior passageway into an inflow passageway for conducting water from the proximal end to the distal end of the pipe, and an outflow passageway for conducting water from the distal end to the proximal end of the pipe. The divider segregates the water in the outflow passageway from the water in the inflow passageway.

22 Claims, 11 Drawing Sheets

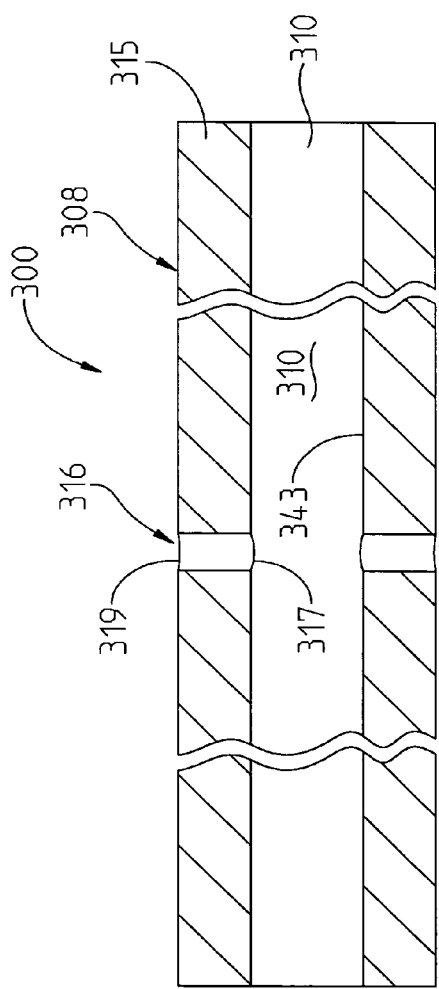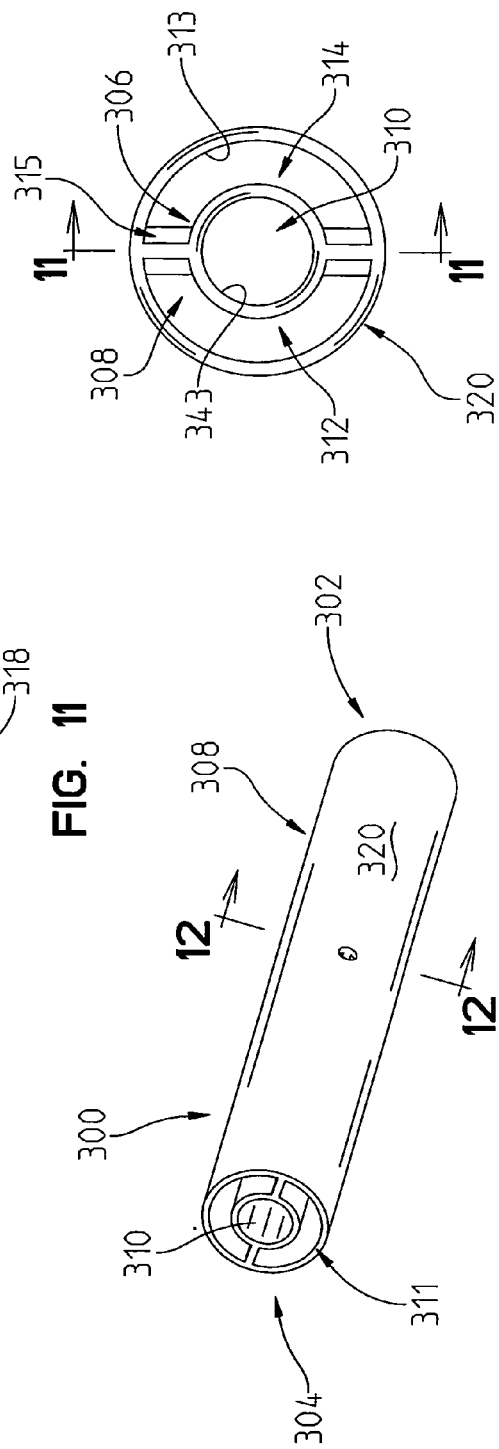

GEOTHERMAL HEAT EXCHANGER

I. PRIORITY CLAIM

This application claims benefit of U.S. Provisional Patent Application No. 60/931,737 filed 25 May 2007, which provisional application is fully incorporated herein by reference.

II. TECHNICAL FIELD OF THE INVENTION

The present invention relates to a heat exchanger, and more particularly, to a heat exchanger that is especially well adapted for use in geothermal heating and cooling systems, as a thermal energy storage device.

III. BACKGROUND OF THE INVENTION

Geothermal heating and cooling systems typically employ water as a medium to absorb and retain heat. The water that passes through the geothermal heating piping system can be passed through a heat exchanger, to which a blower is attached to pass the air over the heat exchanger.

The geothermal heating and cooling system obtains its ability to aid in the heating or cooling of a building by exploiting the general constancy of ground temperatures. A typical geothermal heating system comprises a closed loop pipe system through which water is pumped. A portion of the pipe is disposed underground. Often a bore hole is drilled into the ground into which a portion of the closed loop is placed. As the water in the pipe travels in the pipe down and up the bore hole, the temperature of the ground surrounding the bore hole serves to either add heat to the water in the pipe or absorb heat from the water in the pipe, depending upon whether the water within the pipe is hotter or cooler than the surrounding ground temperature. Since the ground surrounding a bore hole remains at a generally constant temperature, the water passing through the pipe can, at least theoretically can be heated or cooled to this constant temperature regardless of the season. This enables the geothermal system to deliver water for use at the building that is generally at the same temperature on a year-round basis.

In most cases, geothermal heating and cooling systems are used in connection with a mechanical refrigeration system, such as a heat pump.

A typical mechanical refrigeration system includes a pair of heat exchangers, and a closed-loop piping system that runs between, and in both of the two heat exchangers. A refrigerant, such as R-22-type refrigerant is passed through the mechanical refrigeration systems' piping system. A compressor is provided for compressing the refrigerant from a gaseous to a liquid state, and an expansion valve is provided for enabling the liquified refrigerant to expand from a compressed, liquid state into a gaseous state. As is well known within the refrigeration art, the expansion of a refrigerant from a liquid to a gaseous state absorbs heat, whereas the compression of a refrigerant from a gaseous to a liquid state gives off heat.

In a typical heat pump system, a first heat exchanger is placed just downstream of the expansion valve, and a second heat exchanger that is disposed downstream of the compressor. The expansion of the refrigerant from a liquid to a gaseous state cools the "pipe" (which is formed into a "coil") through which the refrigerant is flowing in the first heat exchanger. A fan can then be provided to pass air over the now-cooled pipe coil of the first heat exchanger, so that the air passed thereover becomes cooled by the pipes. When operated in the air conditioning mode, this cooled air is then circulated throughout the building and serves to cool the building. When in the air conditioning mode, this first heat exchanger is usually placed within the interior of the building.

During this same air conditioning cycle, the other heat exchanger, that is placed downstream of the compressor, is placed outside of the building. When the compressor compresses the refrigerant into a liquid refrigerant, heat is given off. A fan can be placed adjacent to the outside heat exchanger to blow air over the heat exchanger to thereby help to remove the hot air from the vicinity of the heat exchanger, and to draw cooler air into the area near the heat exchanger to absorb more heat from the heat exchanger coil.

To a large extent, the efficiency of a mechanical refrigeration system unit is determined by the ambient temperature of the air that is adjacent to the outside heat exchanger, for the more heat that can be exchanged, the more efficiently the compressor can compress the refrigerant into a liquid form.

The above passage describes the operation of a heat pump system when it is operating in an "air conditioning mode". When the mechanical refrigeration system is operating in a "heating mode", the roles of the two heat exchangers are reversed. As such, the interior (first) heat exchanger is placed downstream of the compressor, so that the compression of the liquid refrigerant will give off heat, to thereby heat the air that is blown past the heat exchanger by the fan. This heated air is then circulated throughout the building for heating the building. The outside heat exchanger is placed downstream from the evaporator so that, in the expansion process, it can pick up heat from the ambient environment.

When operating in the heating mode, the efficiency of the refrigeration system and its ability to heat a building is largely dependent on the efficiency by which heat is exchanged in the "outside" heat exchanger. For example, on a very cold day, when the mechanical refrigeration system is serving as a "heater", the coldness of the outside air may provide little heat for the evaporating refrigerant in the second (outside) heat exchanger to absorb. Similarly, when used in an air-conditioning capacity during the summer, the heat of the outside air reduces the efficiency of the condenser's ability to expunge heat from the refrigerant during the compression of the refrigerant into liquid refrigerant by the compressor.

One method for improving the efficiency of such a mechanical refrigeration system is to immerse the heat exchanger in a liquid medium such as water. Use of water as a heat exchange medium helps to improve the efficiency in two ways. The first way it improves efficiency is that water is a better heat exchange medium than air.

A second manner in which efficiency can be improved by placing the water in the heat exchanger at a more appropriate temperature than the corresponding air. For example, water at 52° F. (11° C.) on a hot, 90° F. (32° C.) summer day will much more efficiently absorb heat from a hot condenser coil (outside heat exchange unit) of a mechanical refrigeration system than will the 90° F. (32° C.) ambient air. Conversely, 52° F. (11° C.) water will have a greater propensity to give off heat to an evaporator heat exchange coil on a cold, 10° F. (−12° C.) winter day, than the 10° F. (−12° C.) ambient air.

To capitalize on these efficiencies, a geothermal heating system can be coupled to a mechanical refrigeration system.

In order to prevent the pollution of aquifers, most geothermal energy systems are constructed as a closed-loop system, where water is constantly re-circulated through a closed-loop. A portion of the closed loop extends deep into the ground, so that water passing in the underground portion of the closed loop can take advantage of the relatively constant ground temperature by exchanging heat with the ground surrounding the pipe, so that the water in the geothermal pipe will emerge from the ground at a temperature approximating the ground temperature.

A typical prior art geothermal installation is schematically represented in FIG. 1. A building 10, such as a house, school, factory, office building or the like, includes a mechanical refrigeration system 12, to which the geothermal system 36 is coupled. The mechanical refrigeration system 12 includes an inside (first) heat exchanger 14 and an outside (second) heat exchanger 18. In a heat pump-type mechanical refrigeration system, the inside heat exchanger 14 serves as an evaporator when the system 12 is serving as an air conditioner, and as a condenser when a mechanical refrigeration system 12 is serving as a heating unit. Conversely, the outside heat exchanger 18 serves as a condenser when the mechanical refrigeration system 12 is being used as an air conditioner or cooler, and serves as an evaporator when the mechanical refrigeration system 12 is being used as a heater.

The inside heat exchanger 14 includes a coil 16 through which refrigerant flows, and a fan 22 for pulling air through the inside heat exchanger 14 cabinet, to move air past and over the coil 16, so that the air thus moved by will become cooled through its contact with the coil 16 when the mechanical refrigeration system 12 is being used as an air conditioner, and will become heated when the mechanical refrigeration system 12 is using the inside heat exchanger 14 as a condenser during a heating operation. The outside heat exchanger 18 also includes a coil that is part of the closed-loop of the mechanical refrigeration system. The inside and outside heat exchangers 16, 18 can be constructed generally similarly, except that the outside heat exchanger should be weatherized to withstand outside weather conditions.

An expansion valve 24 and a compressor 26 are provided for allowing the refrigerant to expand (expansion valve 24), and to compress the refrigerant (compressor 26). The outside heat exchanger includes a cabinet 28 that contains the coil 20. The cabinet 28 includes an inflow port 30 through which water from the geothermal heat exchange system 36 can enter the interior of the cabinet 28, and an outflow port 32 from which water of the geothermal exchange system 36 can exit the cabinet 28.

The geothermal exchange system 36 is shown as comprising a closed-loop pipe system 38, wherein water or other fluid within the geothermal system 36 is re-circulated. The geothermal exchange system includes an inflow pipe 40 that brings water into the cabinet 28 of the outside heat exchanger 18, and an outflow pipe 42 that carries water away from the cabinet 28 of the outside heat exchanger 18. A pump 44 is provided for pumping water through the closed-loop geothermal heating system.

The outflow pipe 42 includes a subterranean portion 46, that is disposed below ground level. The inflow pipe 40 also includes a subterranean portion 48 disposed below ground level. The subterranean portions 46, 48 of the outflow pipe 42 and inflow pipe 40 are joined at a U-shaped connector 50, so that water reaching the lower "end" of the outflow pipe 42 can flow through the connector 50 into the inflow pipe 40.

The subterranean portions 46, 48 are typically positioned within a bore hole 52. In a "vertical" geothermal system, the bore hole may be quite deep, and may often exceed 100 feet (30.5 m) in length. Bore holes of 1000 feet (305 m) in length are not rare. Typically, a bore hole of six to eight inches (15.3 cm to 20.3 cm) in diameter is employed, as a bore hole of that size will provide enough area for the insertion of both the subterranean portions 46, 48 of the inflow pipe 40 and outflow pipe 42.

After the bore hole 52 is dug, and the subterranean portions 46, 48 of the outflow pipe 42 and inflow pipe 40 are inserted into the bore hole 52, the area around the pipe is packed with a grouting material, that may comprise bentonite. The grouting is provided both for providing stability to the hole, and also to prevent water or fluid flowing through the inflow and outflow pipes 40, 42 from coming in contact with any water and any aquifers through which the pipes 40, 42 may pass.

The depth of the bore hole will vary based on a variety of factors, and several factors must be taken into consideration when determining how deep to drill the bore hole. One factor relates to cost. For the two-separate side-by-side pipe type system shown in FIG. 1 and described above, the installer must normally employ a bore hole having a six inch (15.3 cm) diameter or greater, in order to accommodate the pipes. The cost of drilling the bore hole at typical 2007 rates is somewhere between $6.00-$8.00 per foot (0.3 m). As such, a 100' (30 m) hole would typically cost somewhere between $600.00 and $800.00 in drilling costs alone. As such, cost considerations suggest that it is preferable to drill the hole no deeper than one needs to.

The second consideration relates to heat exchange capacity. As water flowing through the subterranean portions 46, 48 of the pipe exchanges heat with the ground in which the bore hole is dug, it follows naturally that a deeper (longer) bore hole would provide a greater heat exchange capacity than a shallower (shorter) bore hole, if, for no other reason than a deeper bore hole would provide a greater residence time for water within the subterranean portions 46, 48 of a geothermal system, and would provide a greater surface area of "ground" with which to exchange heat.

In this regard, the Applicant has found, that a "ton" of heating or cooling capacity is typically achieved by a bore hole of between 150 and 200 feet (46 and 61 m) with a side-by-side pipe system. By way of example, if one desires to achieve four tons of heating and cooling capacity (heat exchange capacity), it follows that one would need to drill a bore hole that was somewhere between 600 and 800 feet (183 and 244 m) in depth.

Another factor that affects the decision of how deep to drill the bore hole (and hence, its associated cost) relates to the heat exchange capacity of the particular materials used in constructing the subterranean portions 46, 48 of the pipe, and the grout that is disposed in the space 52 between the pipes and the edge of the bore hole.

To a large extent, environmental considerations and reliability considerations impact the geothermal system constructor's ability to achieve optimum heat exchange capabilities. In theory, one could likely improve the heat exchange capabilities of the subterranean pipes 46, 48 by employing metal pipes as metals usually have a greater thermal conductivity than plastics (e.g. polybutylene piping). Unfortunately, steel and metal pipes are often unacceptable, because of their propensity to corrode, and hence fail over a reasonably short period of time. As such, reliability, cost concerns, and environmental suggest that one employ plastic pipe. Although plastic pipe has generally poorer thermal conductivity properties than metal, it is much more durable.

Environmental concerns also factor into the technologies by which one can construct a geothermal system. These environmental concerns arise largely from the fact that many cities forbid the use of "pump and dump" geothermal systems. In pump-and-dump systems, the water for the geothermal system is drawn from an aquifer, run through the heat exchanger, and then deposited back into the aquifer. Such pump and dump systems are forbidden in many locations because of the fact that they can pollute the ground water aquifer. As such, most currently-installed geothermal systems are closed-loop systems, that re-circulate the same water.

In order to protect the aquifer, it is often required that the system be sealed from the "soil" of the walls of the bore hole through the use of some impervious material that prevents water in the pipe 46, 48 from leaking into the aquifer. This impervious material typically comprises a "grout". The grout may be made of one of a variety of materials, such as a generally impervious bentonite clay. This bentonite clay is placed in the bore hole to surround and encase the subterranean pipes 46, 48.

Unfortunately, the grout adversely impacts the heat transfer capabilities of the pipe. To overcome the adverse impact on heat transfer properties caused by the grout, the installer is forced to drill the bore hole much deeper than if the pipes 46, 48 could directly contact the soil.

One improvement to the above-mentioned dual-pipe system is a concentric pipe system invented earlier by the Applicant.

The concentric (and typically co-axial) pipe is schematically shown in FIGS. 2 and 3 as including an outer, outflow pipe 54, that preferably has a 3" (7.6 cm) diameter, and an inflow pipe 56. The inflow pipe 56 is disposed concentrically and interiorly of the outflow pipe 54, and typically has a one or 1.25 inch (2.54 or 3.2) cm diameter.

The concentric pipe has significant benefits over the twin-pipe system shown in FIG. 1. One benefit is that it can be placed in a smaller bore hole, such as a 4" or 4.5" (10 or 11.5 cm) diameter bore hole, rather than the 6" (15.25 cm) diameter bore hole typically used for the twin-pipe system shown in FIG. 1. This use of a smaller bore hole helps to reduce drilling costs, as it costs less per foot (typically $6.00 per foot versus $8.00 per foot (0.3 m) for a 6" (15.25 cm) bore hole). Additionally, because of the configuration of the concentric pipe arrangement 54, 56, there is usually a smaller gap between the exterior wall of the outflow pipe 54, and the inner wall of the bore hole. This smaller gap requires less grout to be placed between the concentric pipe 53 and concentric pipe 58 and the bore hole wall. This use of a thinner layer of grout both helps to reduce grout costs. More importantly, a thinner grout layer permits better heat exchange between concentric pipe system 58 and the grout surrounding the bore hole.

Although the above two described configurations do perform their functions in a workman-like manner, room for improvement exists. Accordingly, it is one object of the present invention to provide an improved pipe system for use in connection with a geothermal energy system.

IV. SUMMARY OF THE INVENTION

In accordance with the present invention, a pipe for use in a geothermal heat exchange system is disclosed. The pipe is insertable into a bore hole having a proximal end and a distal end. The pipe comprises a pipe having a proximal end, a distal end and an outer wall member. The outer wall member includes an external surface, and an interior surface defining an interior passageway through which a heat exchange fluid can flow. The pipe also includes a divider extending between opposed points of the interior surface for dividing the interior passageway into an inflow passageway for conducting water from the proximal end to the distal end of the pipe, and an outflow passageway for conducting water from the distal end to the proximal end of the pipe. The divider segregates the water in the outflow passageway from the water in the inflow passageway.

Preferably, the heat exchanger comprises a three-chambered extrudable or moldable pipe. The pipe includes an outer wall that can be any shape, but is preferably circular in cross section. A divider wall extends diametrically between opposed points of the outer wall. The divider wall divides the interior of the pipe into a first or inflow chamber, and a second or outflow chamber. Each of the first and second chambers can be generally hemi-cylindrical in shape.

In a first embodiment shown in FIGS. 1-9, the divider wall preferably includes a first wall portion and a second wall portion that define an air gap there between. The purpose of this air gap is to reduce heat transfer between fluid in the outflow and the inflow pipe portion.

A geothermal heat exchange system must be grouted in so as to completely isolate it from the surrounding ground, so the contents of the heat exchange system do not contaminate or otherwise affect the ground water. Therefore, any geothermal heat exchanger must provide a method for economical installation of grout. One preferable method is shown in the alternate embodiment shown in FIGS. 10-17 and described herein.

In the alternate embodiment shown in FIGS. 10-17, there is formed a central passageway within the heat exchanger pipe. The central passageway serves the purpose of receiving a grout dispensing pipe that can be inserted into the central passageway. During the installation of the heat exchanger pipe, grout is inserted into the central passageway through the grout dispensing pipe.

This alternate embodiment heat exchanger pipe includes a spaced array of lateral passageways that extend between the exterior of the pipe and the interior of the central passageway. During the installation of grout in the pipe, the grout pipe is inserted into the central passageway so that it extends all the way to the bottom of the heat exchanger pipe. Grout is then pumped through the grout dispensing pipe so that it can flow out of the lower end of the grout pipe. This grout flows out of the bottom of the grout pipe, and into the bottom of the central passageway of the heat exchanger pipe.

During the pumping of grout into the central passageway, the grout dispensing pipe is retreated axially upwardly and outwardly out of the heat exchanger pipe, to move the lower end of the grout dispensing pipe increasingly further away from the bottom of the central passageway. As the grout pipe is lifted upwardly, more grout is pumped into the open area of the central passageway. A constant pressure of grout infusion is maintained while the volume of grout is increased. When the grout reaches a lateral passageway, the grout will flow radially outwardly out the lateral passageway and into the space between the exterior surface of the grout pipe and the radially inwardly facing surface of the bore hole. The grout will then occupy this space to form a grout layer or grout encasement for surrounding the exterior of the heat exchanger pipe.

One advantage of the use of the central grout dispensing passageway is that it permits a relatively smaller diameter heat exchanger pipe to be used, that thereby permits a smaller bore hole to be dug, which reduces the cost of the heat exchanger installation. Also, by reducing the thickness of the grout layer, one reduces the insulative influence of the grout, which thereby improves the transfer properties between the water flowing within the pipe and the surrounding ground. This serves to reduce the thermal resistance of the geothermal system.

One feature of the present invention is that it is preferably made from a bi-modally structured, high density polyethylene material. The best material that the Applicants know at present for manufacturing the device is a plastic known throughout the world (except in the U.S.) as "PE-100" and which is known in the United States as "PE4710".

The particular plastic that is preferred by Applicants has a bi-modal structure, rather than the unimodal structure that is commonly used in connection with known pipes of the prior art. This bi-modal structure results in a higher strength pipe, wherein a pipe of a given diameter is capable of withstanding much higher pressures than the unimodal pipe that it replaces. Additionally, the bi-modal structure results in better "slow crack resistance" and also better "rapid crack resistance", which results in both a more rigid pipe and also a pipe that is less subject to failure. It is Applicants' belief that a bi-modal pipe is likely to have a longer and more problem resistant useful life than an unimodal pipe.

Additionally, the plastic used with the present invention permits the walls of the pipe to be made more thin. In addition to reducing the amount of material necessary to construct the pipe, the use of thinner walls enhances the thermal transfer between the water flowing within the interior of the pipe and exterior of the pipe including the grout and the surrounding ground.

The present invention is believed to have enhanced heat transfer capabilities, when compared to currently-existing pipes. These enhanced heat transfer capabilities, shown in FIG. 18, permit the user to achieve a level of heat transfer in a geothermal energy system, using a smaller length of pipe than with the prior art. By being able to achieve the same cooling capacity (e.g. 1 ton of cooling) with less pipe, the user can incur less boring costs because fewer feet of bore hole need be drilled, when compared with the prior art.

These and other features and advantages of the present invention will become apparent to those skilled in the art upon a review of the drawings and detailed description presented below, which represent the best mode of practicing the present invention perceived presenting by the Applicant.

IV. BRIEF DESCRIPTION OF DRAWINGS

FIG. 10 is a perspective view of an first alternate embodiment multi-chambered pipe of the geothermal system of the present invention;

FIG. 11 is a sectional view taken along lines 11-11 of FIG. 12;

FIG. 12 is a sectional view taken along lines 12-12 of FIG. 10;

Figure 21:
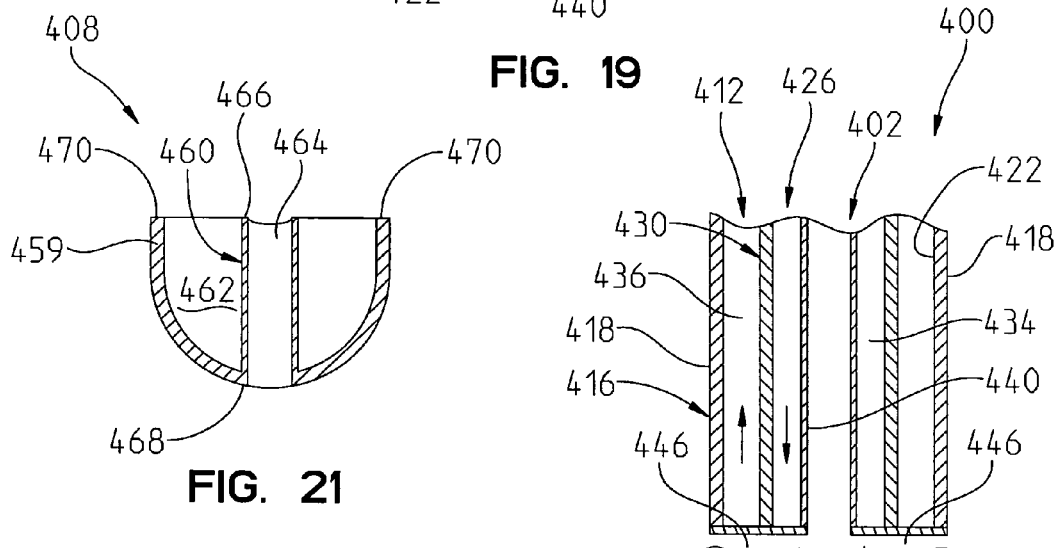
Figure 20:
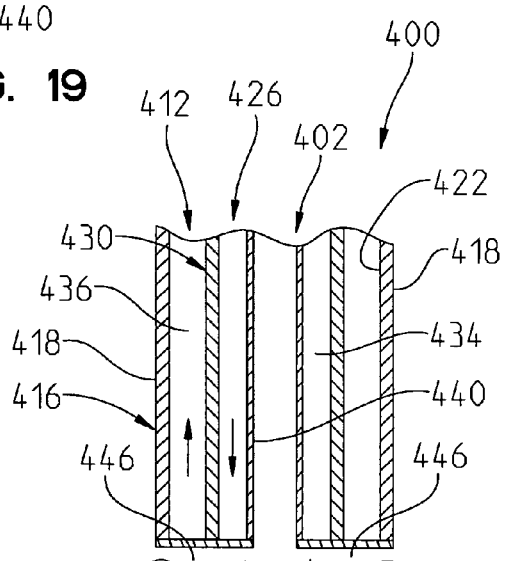
FIG. 20 is a sectional view taken along lines 20-20 of FIG. 19.
Figure 22:
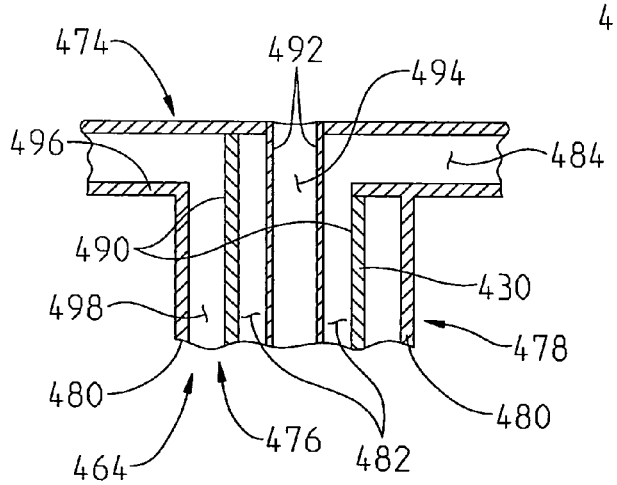

FIG. 21 is a sectional view of a bottom cap member 408 useable with the second alternate embodiment geothermal system exchanger 400 of the present invention; and FIG. 22 is a top cap member 404 useable with the second alternate embodiment geothermal system 400 of the present invention.

V. DETAILED DESCRIPTION

Figure 4:
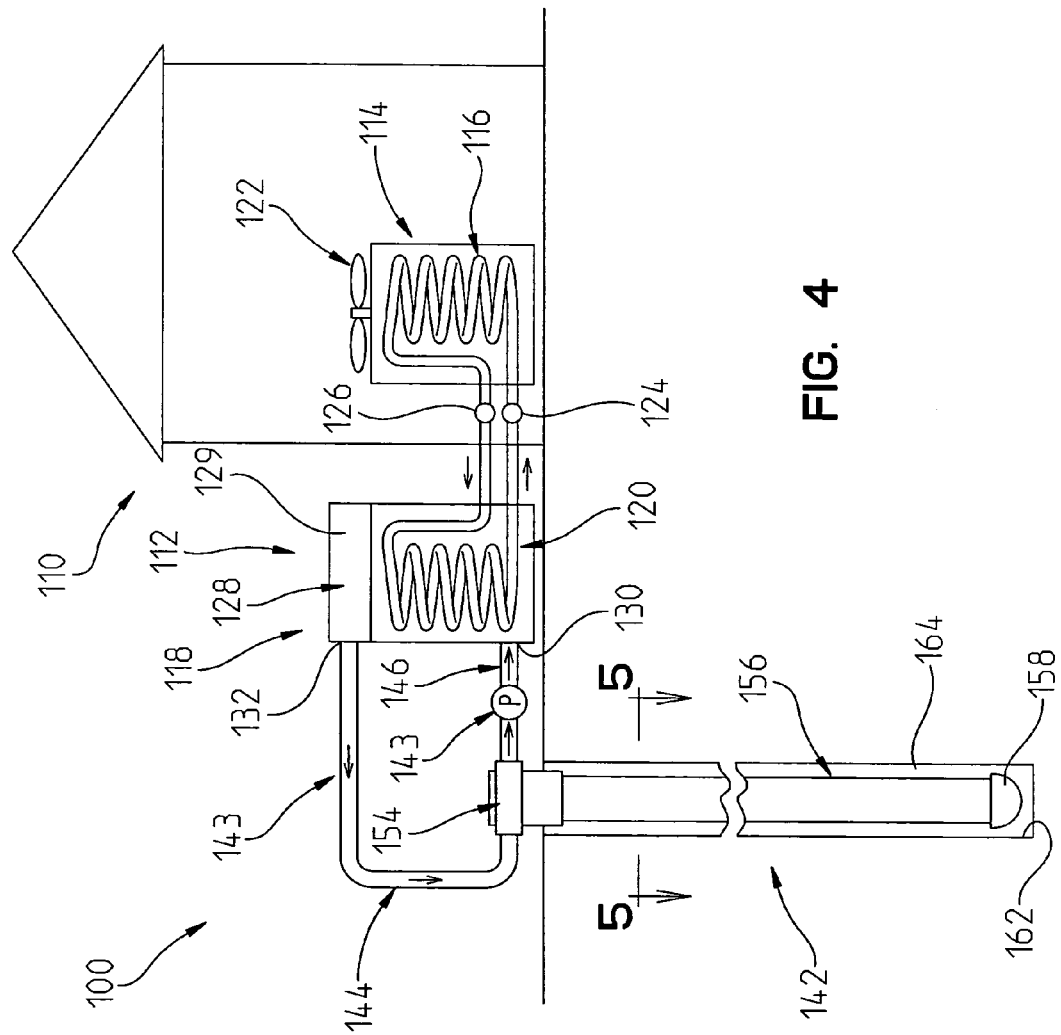
FIG. 4 is a schematic view of a geothermal heat exchange system of the present invention coupled to a mechanical refrigeration system of a building.

The geothermal heat exchange system 100 of the present invention is best shown in FIGS. 4-9. Turning first to FIG. 4, the geothermal heat exchange system 100 is shown schematically as being coupled to the mechanical refrigeration system 112 of a building 110.

Figure 1:
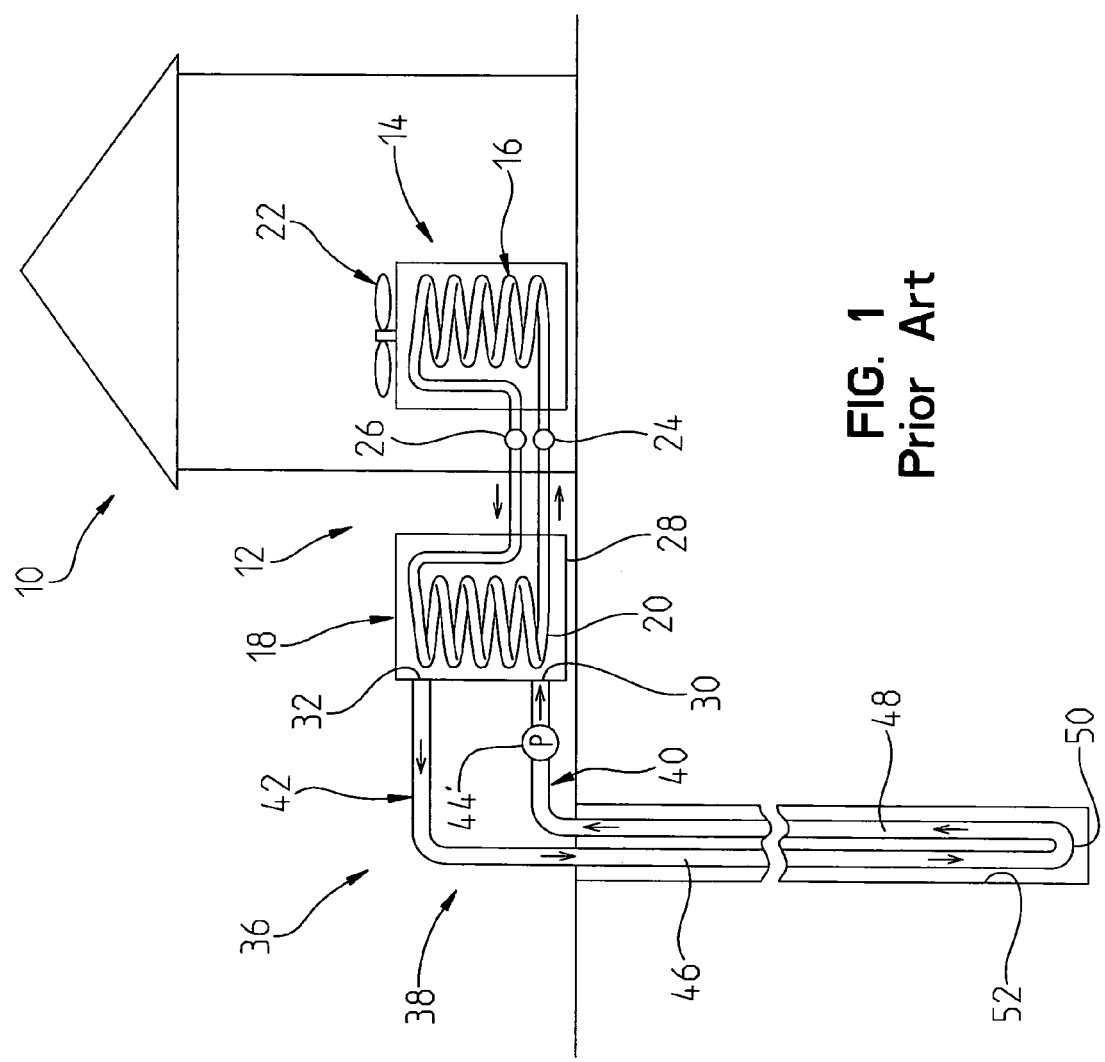
FIG. 1 is a schematic view of a prior art side-by-side geothermal heat exchange system used in connection with a mechanical refrigeration system.

Generally, mechanical refrigeration system 112 and building 110 are similar to mechanical refrigeration system 12 for building 10 shown in FIG. 1. The mechanical refrigeration system 112 includes an inside (first) heat exchanger having a coil 116 through which refrigerant flows; and an outside (second) heat exchanger 118 having a coil 120 through which refrigerant flows, in the same closed loop as does the refrigerant flowing through the coil 116 of inside heat exchanger 114. A fan 122 is provided for causing air to flow across the coil 116 of the inside heat exchanger so that, during summer, the air can be cooled by its passage past the coil 116; and in the winter the air can be heated by its passage across the coil 116. An expansion valve 124 and compressor 126 are disposed within the loop for performing their normal functions.

The outside heat exchanger 118 includes a cabinet 128 through which water can flow. In passing through the cabinet, the water is placed in thermal contact with coil 120. The cabinet 128 includes an inflow port 130 through which water can flow into the cabinet from a geothermal heat exchanger 100. An outflow port 132 is provided for conducting water from the interior of the cabinet 129 to the geothermal heat exchanger.

The geothermal heat exchange system 100 includes a subterranean portion 142, and a lateral portion 143. The subterranean portion 142 is disposed primarily underground, in a bore hole 162. The lateral portion 143, may be disposed above or below the ground, and includes a lateral outflow pipe 144 for conducting the water from the cabinet 128 to the subterranean portion 142 of the geothermal energy system 100; and a lateral inflow pipe 146 for conducting water from the subterranean portion 142 of the geothermal energy system 100 to the cabinet 128. A pump 148 is shown as being disposed in the lateral inflow pipe 146 for pumping water through the geothermal energy system 100. Alternately, the pump 148 can be disposed in the outflow pipe 144.

Although only a single subterranean portion 142 of the geothermal energy system is shown, the geothermal energy system of the present invention will, in most case, include a plurality of subterranean portions. In systems that contain a large number of subterranean portions, it may be necessary to employ several lateral pipes to extend between the subterranean portion. As will be described in more detail below, it is often necessary to employ a plurality of subterranean portions 142 and bore holes 162 in order to achieve the desired cooling capacity of the geothermal energy system 100.

The subterranean portion 142 includes three primary components, including a top cap 154, that is mateable to lateral inflow and outflow pipes 144, 146; a multi-chambered pipe 156 that extends down the bore hole for a considerable length; and a bottom cap 158 that is placed at the lower (distal) end of the multi-chambered pipe 156 and is provided for enabling water to flow from the inflow chamber of a multi-chambered pipe 156 to the outflow chamber of the multi-chambered pipe 156.

The subterranean portion 142 is disposed in a bore hole 162, the numbers and length of which will vary depending upon the cooling capacity desired. Because of the compact nature of the multi-chambered pipe 156, the Applicant has found that a smaller diameter bore hole can be used with the multi-chambered pipe 156 of the present invention, than can be used with a dual, side-by-side pipe of the type shown in FIG. 1. For example, for comparable systems, the Applicant has found that a 4" (10.1 cm) diameter bore hole will work well with the multi-chambered pipe 158 of the present invention, whereas a 6" (15.24 cm) bore hole was necessary to provide sufficient space for the side-by-side two-pipe system of the type shown in FIG. 1.

As the bore hole 162 must be drilled so that its diameter is slightly larger than the diameter of the multi-chambered pipe 156, a space will exist between the outer surface of the multi-chambered pipe 156, and the inner surface of the bore hole 162. For environmental reasons, this space is filled with a grout, to seal the geothermal system 100 pipe, and to isolate the water within the subterranean portion 142 of the geothermal energy system 100 from the surrounding ground, and more particularly, from water in aquifers within the ground surrounding the bore hole 162.

Figure 6:
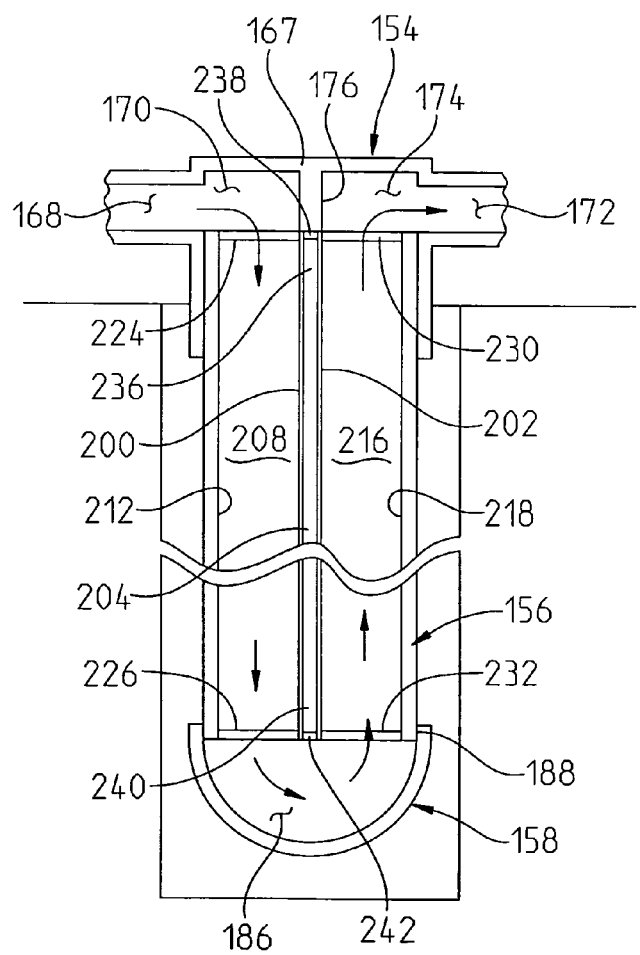
FIG. 6 is a sectional view taken along lines 6-6 of FIG. 5.
Figure 7:
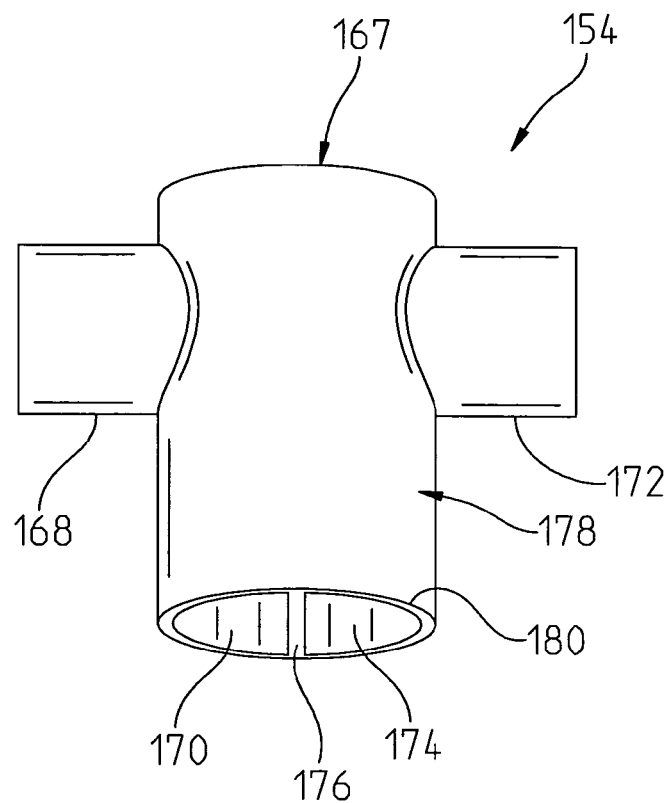
FIG. 7 is a plan view of a top cap of the subterranean portion of the piping system of the geothermal heat exchange system of the present invention.

Turning now to FIGS. 6 and 7, the top cap portion 166 includes an inflow port 168 that can be coupled to outflow pipe 144, and an inflow chamber 140 that is directly downstream of the inflow port 168. The top cap portion 166 also includes an outflow port 172 that can be coupled to the inflow pipe 146. An outflow chamber 174 is disposed within the top cap portion 166, and is directly upstream in the flow of water from the outflow port 172. A diametrally extending divider member 176 is formed to divide the inflow chamber 170 from the outflow chamber 174. The divider member 176 keeps streams flowing therein separate, and prevents water in the two chambers 170, 176 from intermingling. The top cap portion 166 also includes a cylindrical pipe-receiving portion 178 that terminates at its downward most extent in a pipe receiving lip 180. Pipe receiving lip 180 is sized and configured for being received by the upper end of the multi-chambered pipe 152 that extends down through the bore hole.

Figure 8:
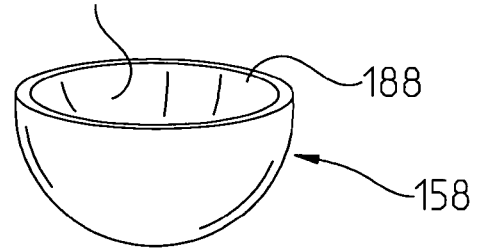
FIG. 8 is a plan view of a bottom cap of the pipe system of the geothermal heat exchange system of the present invention.

The bottom cap 158 is generally hemi-spherical in shape, and includes a hollow hemi-spherical interior. The bottom cap 158 also includes a perimeteral lip 188 that is sized and configured for engaging the lower end of the multi-chambered pipe 156. The bottom cap 158 is best shown in FIGS. 8 and 6.

Figure 5:
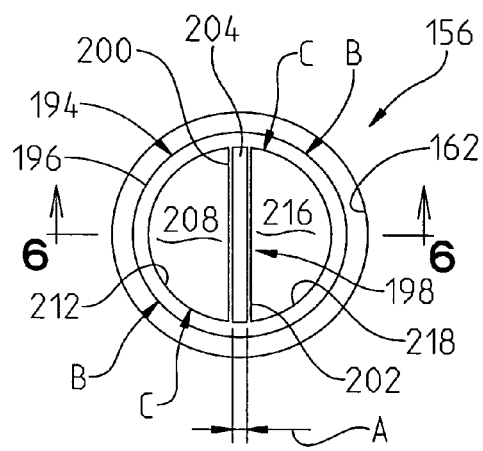
FIG. 5 is a greatly enlarged sectional view taken along lines 5-5 of FIG. 4.
Figure 9:
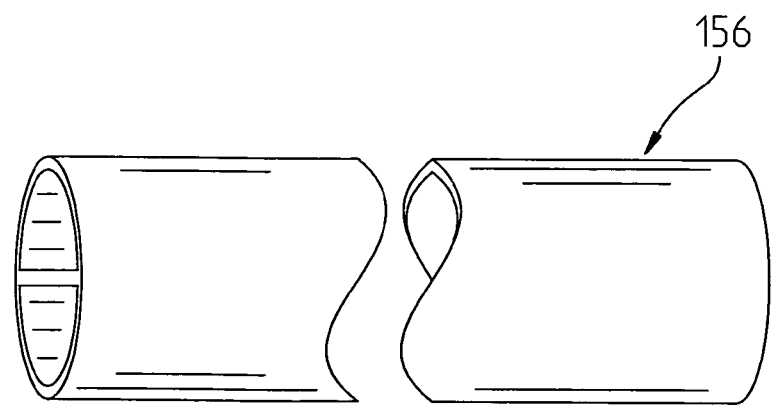
FIG. 9 is a plan view of a multi-chambered pipe of the geothermal system of the present invention.
Figure 13:
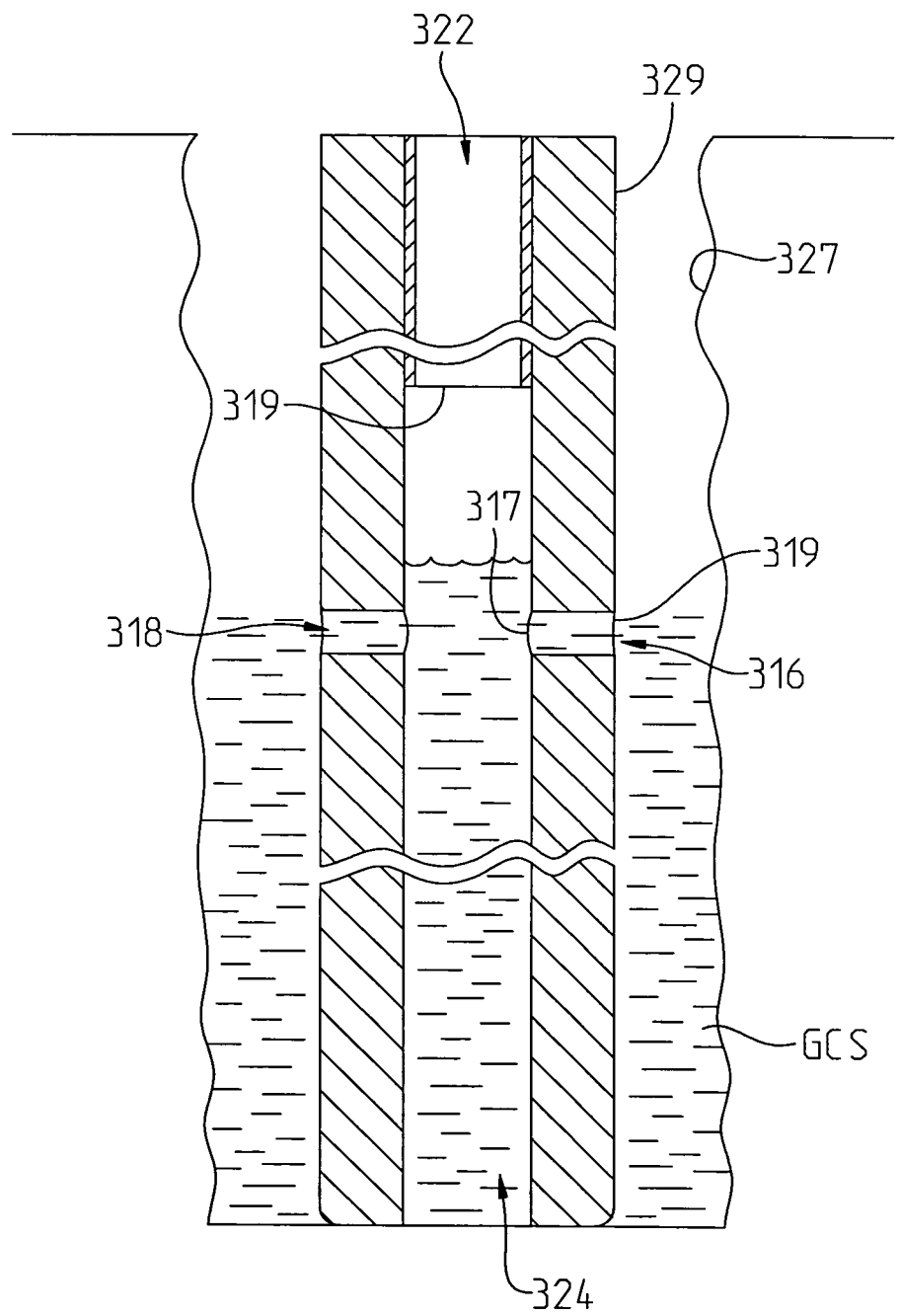
FIG. 13 is a sectional view showing the first alternate embodiment pipe of FIG. 10 placed within a bore hole and with a grout pipe inserted within the central bore to illustrate the manner in which grout is inserted into a pipe in a bore hole in accordance with the present invention.

As best shown in FIGS. 5, 6 and 9, the multi-chambered pipe 156 is generally cylindrical in configuration, and includes a cylindrical outer wall 194 having a cylindrical exterior surface 196, and a diametral divider 198 which extends between opposed points of the interior surface of the interior surface of the outer wall 194. As best shown in FIG. 5, the multi-chambered pipe 156 has a generally constant cross section, for facilitating its formation through an extrusion process. Although the multi-chambered pipe 156 is shown as having a circular cross sections, it will be appreciated that the pip 156 could have another cross-sectional shape, such as, for example, a rectangular or oval or elliptical cross sectional shape.

The diametral divider 198 comprises a first divider wall 200 that is disposed in a parallel relationship with a second divider wall 202, to define an air gap 204 there between. The air gap 204 provides an "insulating" layer, to help insulate and thereby retard the transfer of heat between water in the inflow passageway 208 and outflow passageway 216. Preferably, the air gap is approximately $\frac{1}{10}$" (0.25 cm) in width as measured across arrows A-A. Although divider 198 is described herein as being "diametrical", it will be appreciated that it need not extend across the diameter, but instead could be a "chordal" divider wall. As used herein the term "diametrical" is to be given a broad-enough interpretation to encompass both planar and non-planar divider walls; and also walls that extend across the diameter, and divider walls that extend across "chords".

The first and second divider walls 200, 202 of the perimetral divider 198 define, respectively, a hemi-cylindrical inflow passageway 208 and a hemi-cylindrical outflow passageway 216. The hemi-cylindrical inflow passageway 208 is defined further by the interior surface 212 of the outer wall 194. In one preferred embodiment, the outer diameter of the cylindrical outer wall 194, as measured from a distance between arrows B-B as approximately 3 inches (7.6 cm), with the inner diameter measuring between point C-C being slightly less. A pipe of this size will have approximated the same cross sectional area for each of the inflow passageway 208 and outflow passageway 216 with each passageway 208, 216 layers are of a little bit less than 3.5 sq. in. (22.6 sq. cm).

Although it will be appreciated that larger and smaller diameter pipes can be used, with resultant greater and smaller flow capacities, it should also be appreciated that with such larger and smaller pipes, the relative dimension should bear some relation to those set forth above, that are given for a preferred embodiment 3" outer diameter pipe. As is discussed above, a "chordal" diametral wall can be employed that would form an inflow passageway and out flow passageway having different sizes. However, it is preferred that the diametral divider wall be one that divides the interior of the pipe into an inflow passageway and outflow passageway of approximately the same size.

The inflow passageway 208, as shown in FIG. 6, includes a first or upper end 224, and a second or lower end 226. In the inflow passageway 208, water flows generally from the first end 224, that is adjacent to top cap portion 154, in a direction as indicated by the arrows, and leaves the inflow passageway 208 adjacent to the second (bottom) end 226, that is disposed adjacent to the bottom cap portion 158 to flow into the bottom cap portion's interior. The outflow passageway 216 also includes a first end 230, through which water enters the outflow passageway 216 from the bottom cap, and that is disposed adjacent to the bottom cap portion 158. The hemi-cylindrical outflow passageway 216 also includes a second or upper end 232 through which water exits the outflow passageway 216, and that is disposed adjacent to the top cap portion.

The air gap chamber 240 preferably includes an upper plug 238 disposed at its first or upper end 236, and a lower plug 242 that is disposed at its second or lower end 243. The plugs 238, 242 serve to prevent water from flowing within the air gap 240. Although a "plug" is shown in the drawings, it will be appreciated that the ends of the air gap 240 may be closed by other means, such as sealing the first and second divider walls 200, 202 together, such as by sonically welding, melting or otherwise joining them. Alternately, the central divider member 176 of the top cap portion can serve as a plug that is inserted into the first or upper end 236 of the air gap 204 to thereby plug it, while simultaneously, aligning the top cap portion 164 to the proper orientation on the pipe 156.

The pipe of the present invention contains several benefits over prior known pipes used in connection with geothermal systems.

One advantage of the pipe is the material from which it is made. As discussed above, most known prior art pipes are made from a polybutylene material. By contrast, the Applicant has found that a high density, bi-modally structural polyethylene material, and preferably a material known as PE-100 or PC 4710 can be used to form the pipe of the present invention (collectively referred to as Bi-Modal High Density Polyethylene, or (BMHDPE) to provide results that the Applicant believes will be markedly superior to prior known pipe. BMHDPE material is a very high density plastic, when compared to the current polyethylene plastics used for a variety of purposes today. The Applicant has found that the increased strength provided by the HDPE-100 plastic enables the user to be able to employ a significantly thinner pipe wall than the known prior art pipe walls. For example, the thickness of the currently used polybutylene 3" inch pipe of the type used in either the side-by-side geothermal system (FIG. 1) or the concentric pipe system (FIG. 2) is approximately 0.25 inches (6.4 mm) thick. By contrast, the outer wall thickness of a 3" (7.6 cm) multi-chambered pipe made according to the present invention can be made to only be 0.16 inches (4 mm) thick.

Although this relative thinness of the wall provides the advantage of reducing the amount of plastic necessary to make the pipe, it also has a more subtle and important advantage. This advantage is that the relative thinness of the wall provides for better heat transfer between the interior of the inflow and outflow passageway 208, 216 and the ground surrounding the pipe. This increased thermal conductivity has the net result of increasing the rate at which heat is transferred between the water within the passageways 208, 216 and the ground surrounding the bore hole.

Viewed another way, a pipe of a given length (e.g. 100 feet) (30 m) that is made from this high density polyethylene will have a greater cooling capacity than a pipe of the same length, that is made of the prior art polybutylene material. The impact of this on cost is that one can use a shorter length of pipe to achieve a certain desired cooling capacity. This shorter length of pipe means that one can use a shorter bore length to achieve a predetermined cooling capacity than one can with the prior art pipes. The ability to use a shorter bore length has a significant impact on the cost savings of using the pipe of the present invention, since bore drilling costs make up a significant component of the total price of the system.

Additionally, the shape of the pipe helps contribute to its efficiencies. Because the pipe contains an inflow passageway and an outflow passageway that are captured within a single round outer wall 194, the pipe of the present invention helps to maximize the internal capacity of the passageway 208, 216 (and hence their water carrying capacity) while minimizing the outer diameter of the pipe.

This results in two advantages to the installer. The first advantage is that the round cross section of the pipe enables the outer surface 196 of the pipe to be placed closer to the radially inwardly facing inner surface 162 of the bore hole. This relatively closer placement results in less grout being required to fill the space between the bore hole wall 162 and the outside 196 of the pipe. More importantly, it results in better heat transfer characteristics between walls within the passageways 208, 216 of the pipe, and the surrounding ground. This higher heat transfer is achieved because the grout serves as an insulator that retards, rather than accelerates the heat transfer between the ground and the water within the pipe.

An additional advantage of the multi-chambered pipe of the present invention, when compared with the side-by-side configuration shown in FIG. 1, is that smaller bore holes can be used for pipes of a predetermined capacity. As such, for the most commonly used sizes of pipes, one must bore a 6 inch (15 cm) bore hole when using a side-by-side configuration shown in FIG. 1, but only a 4 inch (10 cm) bore hole when using the multi-chambered pipe configuration of the present invention.

This ability to use a smaller sized bore hole not only increases the transfer of thermal energy between the water and the pipe in the surrounding ground (and vice versa), but also reduces the boring costs. At 2007 prices, it has been the Applicant's experience that a typical cost for drilling a 6 inch (15 cm) (diameter) bore hole is approximately $8.00 per foot ($26.25 per metre), whereas a 4 inch (10.1 cm) (diameter) bore hole costs approximately $6.00 per foot ($19.70 per metre) to drill. As such, by using a smaller bore hole with the present invention, drilling costs can be reduced substantially.

Figure 2:
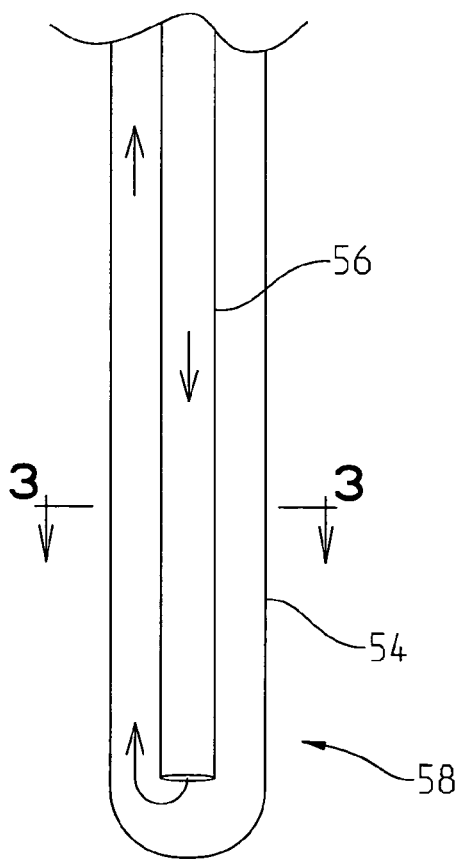
FIG. 2 is a schematic view of an alternate embodiment "concentric pipe" geothermal heat exchange system.

In this regard, it should also be noted that the concentric arrangement shown in FIG. 2 wherein a first pipe is placed inside a second pipe also permits the user to employ a smaller 6 inch (15 cm) bore hole versus the 8 inch (20.3 cm) bore hole used with the side-by-side arrangement. However, it is believed that the thermal transfer capabilities of concentric arrangement shown in FIG. 2 will be inferior to those achievable with the multi-chambered pipe of the present invention.

An alternate embodiment heat exchanger pipe of the present invention is shown in FIGS. 10 to 17 which is referred to herein as a "Three Chamber Pipe 300". This alternate embodiment is designed to efficiently and economically encase the heat exchanger in grout while maintaining a maximum thermal conductivity.

The alternate embodiment geothermal energy system includes a pipe 308 that is generally cylindrical in configuration and features a top end 302 and a bottom end 304. Pipe 308 has an outer wall member 311 and an inner diameter divider 306 that separates the heat exchanger pipe 308 into two chambers through which water can flow, including an inflow chamber 312, and an outflow chamber 314; and a central passageway 310 into which grout can be placed. The divider 306 extends between opposed points of the interior surface 313 of outer wall member 311. As such, the construction of the two water containing chambers 312, 314, and the grout-containing central passageway 310 comprise the three chambers of this three chamber embodiment heat exchanger pipe 300.

The inflow chamber 312 and the outflow chamber 314 are sized equally and separated by the central passageway 310 and a diametrally extending divider member 315. The divider 315 and central passageway 310 keeps the inflow water stream flowing through inflow chamber 312 separate from the outflow stream flowing through the outflow chamber 314. Fluid enters through the inflow chamber 312 and is heated or cooled by the exchange of heat (or cool) with the surrounding ground; and the fluid returning in the outflow chamber 314 also exchanges heat between itself and the surrounding ground through which the pipe 308 extends. As will discussed in more detail below, the central passageway serves primarily as a grout delivery passageway which, with the lateral passageways 316, 318 enable the installer to deliver grout to the grout containing space between the bore hole and the pipe 300, to thereby encase the pipe 308, and isolate the pipe 308 from the surrounding ground.

The geothermal energy system pipe 300 includes at least two radially extending lateral passageways 316, 318 that are formed to be a part of the diametrally extending divider member 315 between the inflow and outflow chambers 312, 314, and the outer wall 320 of the heat exchanger radially outwardly. The lateral passageways extend radially outwardly between a first end 317 in fluid communication with the central passageway 310 and a second end 319 in fluid communication with the outside diameter surface 320 of the pipe 308, and place the axially extending central passageway 310 in fluid communication with the exterior of the pipe 308.

Viewed another way, when the pipe 300 is placed in a bore hole, the lateral passageways 316, 318 place the central passageway 310 in fluid communication with the grout containing space GCS between the bore hole wall 327 and the exterior surface 329 of the outer member 311 of the pipe 308. The lateral passageways 316, 318 are generally evenly spaced along the length of the geothermal energy system pipe 308. However, the number and/or placement of the lateral passageways 318 can be changed, depending on the ground conditions where the system 308 is to be placed or other variables. Preferably, the heat exchanger 308 may include multiple sets of lateral passageway 318.

The central axially extending passageway 310 facilitates the "grouting in" the geothermal energy system 308. During installation, a grout delivery pipe 322 is longitudinally inserted into the central passageway 310. The grout is pumped through the hollow interior passageway of grout pipe 322 and out through the open, distal end 319 of the grout pipe 322 and into the passageway 310 of the heat exchanger pipe 308. Initially, the grout pipe 322 is lowered into the central passageway 310 until the distal end 319 of the grout pipe 322 is placed adjacent to the lowermost end of the central passageway 310, and that the grout pipe 322 extends throughout substantially the entire length of the central passageway 310, and hence, heat exchanger pipe 308.

As grout is pumped down grout pipe 322, the flowable (non-hardened) grout emerges from the distal end 319 and fills central passageway 310. As the central passageway 310 fills, the grout 322 pipe is withdrawn axially upwardly in the central passageway 310. The pipe 322 is slowly withdrawn from the passageway to maintain a constant air pressure between the air and the grout of the end 322 of the system. When grout 324 reaches the lateral passageway 316, 318, the pressure forces the grout radially outwardly through the lateral passageways 316, 318 formed in the diametrally extending divider member 315 and into the Grout Containing Space GCS between the exterior wall 329 of the pipe 308 and the inner wall 327 of the bore hole. The Grout Containing Space GCS becomes filled with grout, thereby encasing the exterior of the system 300 with a layer of grout 324. Once the system 300 is completely encased, the grout pipe 322 is completely withdrawn, leaving the central passageway 310 filled with grout, and the exterior of the system 300 completely surrounded with a thin layer of grout 324 (see FIG. 13).

Figure 14:
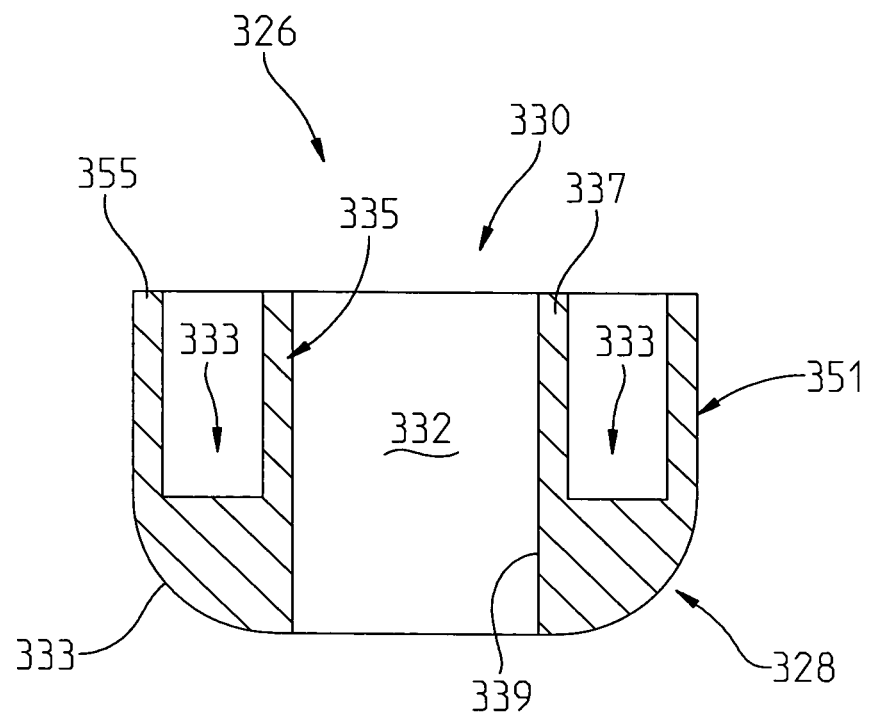
FIG. 14 is a sectional view of a bottom end cap that is utilized with the pipe of the present invention shown in FIG. 10.
Figure 15:
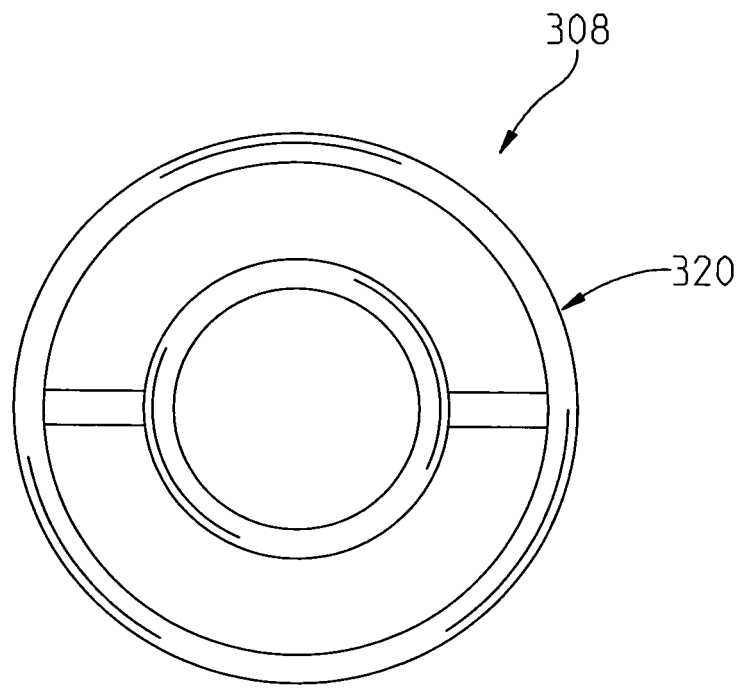
FIG. 15 is a top plan view of the end cap shown in FIG. 14.

FIG. 14 shows the bottom cap 326 which can be used with the geothermal energy system 300 of the present invention. The cap 326 features a bottom end 328 and a top end 330. The bottom end 328 features a centrally disposed aperture-passageway 332 that is disposed co-linearly with the central passageway 310 of the heat exchanger pipe 308. The central passageway 332 of the cap 326 has approximately the same diameter as the central passageway 310 of the pipe 308, and as alignable with the central passageway 310 so that the grout delivery pipe 322 can be extended into the central aperture passageway 322. When fully extended into the central aperture passageway 332, the grout pipe 322 can deliver grout to a grout containing space 333 between the bottom of the cap 326, and the bottom surface of the bore hole, to thereby help to encase the lower end of the system 300 and lower end cap 326 of the geothermal heat exchanger 300.

The proximal end 337 of the annular cylindrical wall 335 has an interior surface 339 that defines the central passageway 332. The cylindrical wall 335 matingly engages the distal end of the cylindrical wall 306, whose inner surface 343 defines the central passageway 310 so as to provide a continuous, aligned passageway 310, 332, which is preferably leak proof. In this regard, the proximal annular end 337 of the cylindrical wall 335 can be bonded, such as with glue or sonic welding to the distal end of the cylindrical wall 306.

The bottom end cap 326 also includes an exterior, annular axially extending wall 351 that includes a proximal annular rim 355. Preferably, annular rim 355 is sized and configured to have the same diameter and shape as the outer wall 320 of the pipe 308 (FIG. 15) so that the outer surface 329 of pipe 308 aligns with the outer surface 351 of bottom end cap 326. Through this alignment, the bottom cap 326 can be joined to the distal end of the lower-most pipe 308 segment by gluing or sonic welding wherein the upper proximal end 355 of wall 351 is bonded to the distal end of wall 320 of pipe 308.

Alternately, the wall 351 of the end cap 326 can have a slightly enlarged diameter to enable proximal end 355 to interiorly receive the distal end of the wall 320 of pipe 308. The bottom cap 326 also features a single, annular chamber 332 that is alignable with each of the inflow and outflow chambers 314, 316. Water flowing out the distal end of the inflow chamber 314 flows into the single annular chamber 333 of the bottom cap 326, where it can travel in the chamber 333 to a position adjacent and below the outflow chamber passageway 316. The water can then flow into the distal end of the outflow chamber 316, and up the outflow chamber 316 to the proximal end thereof.

Figure 16:
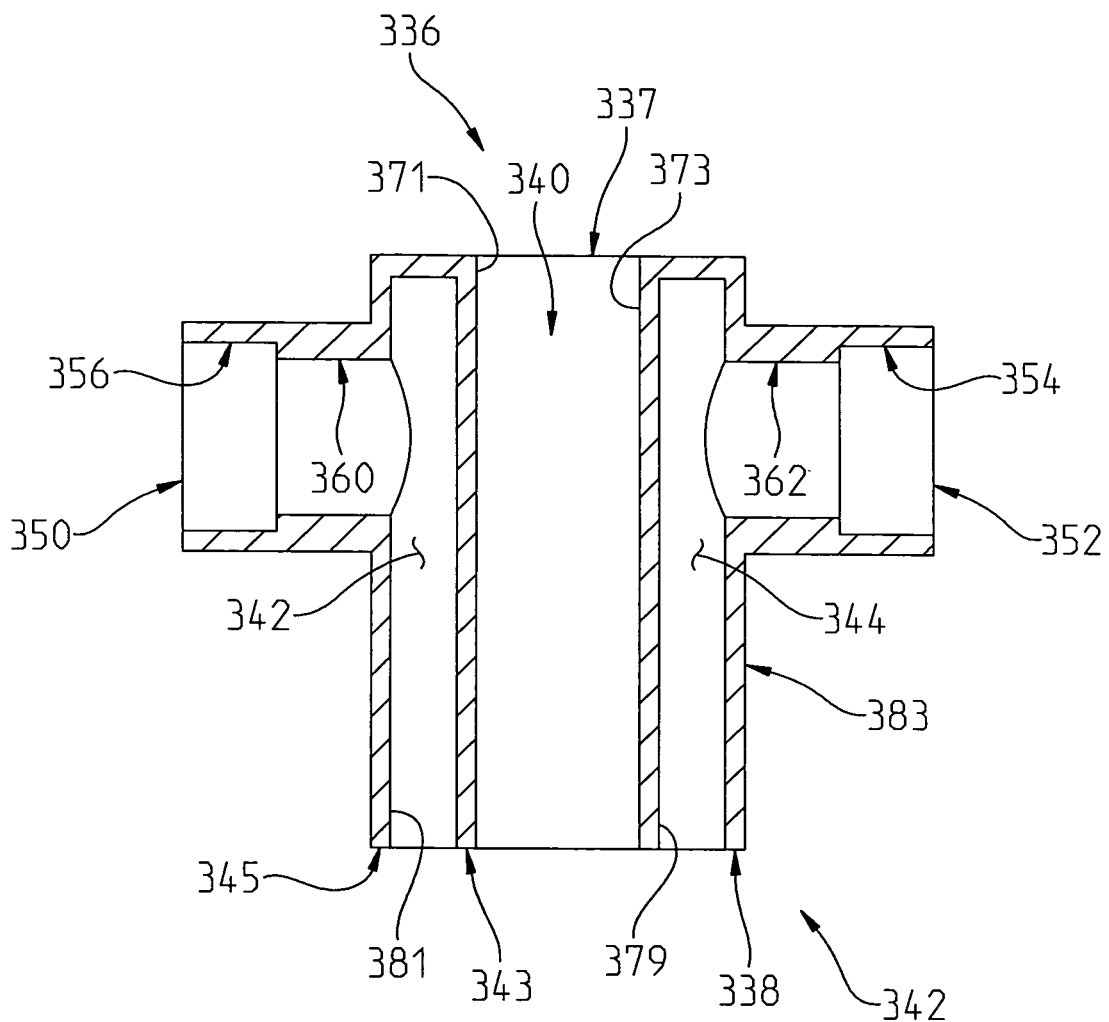
FIG. 16 is a sectional view of an alternate embodiment of the top end cap that is utilized with the pipe of the present invention.
Figure 17:
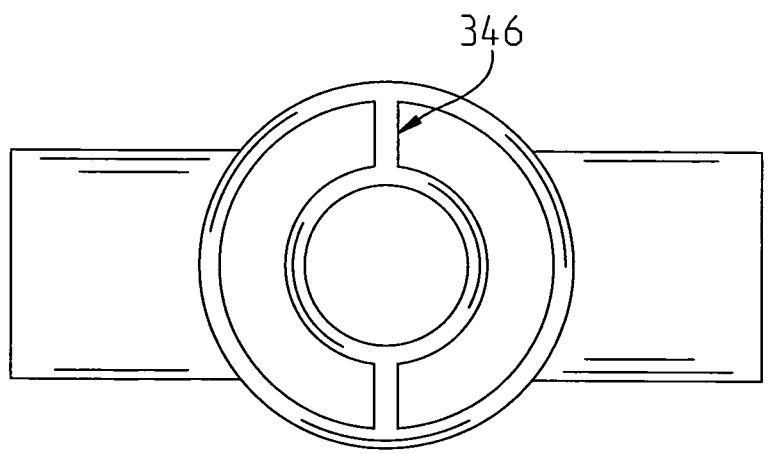
FIG. 17 is a top plan view of the end cap shown in FIG. 16.
Figure 18:
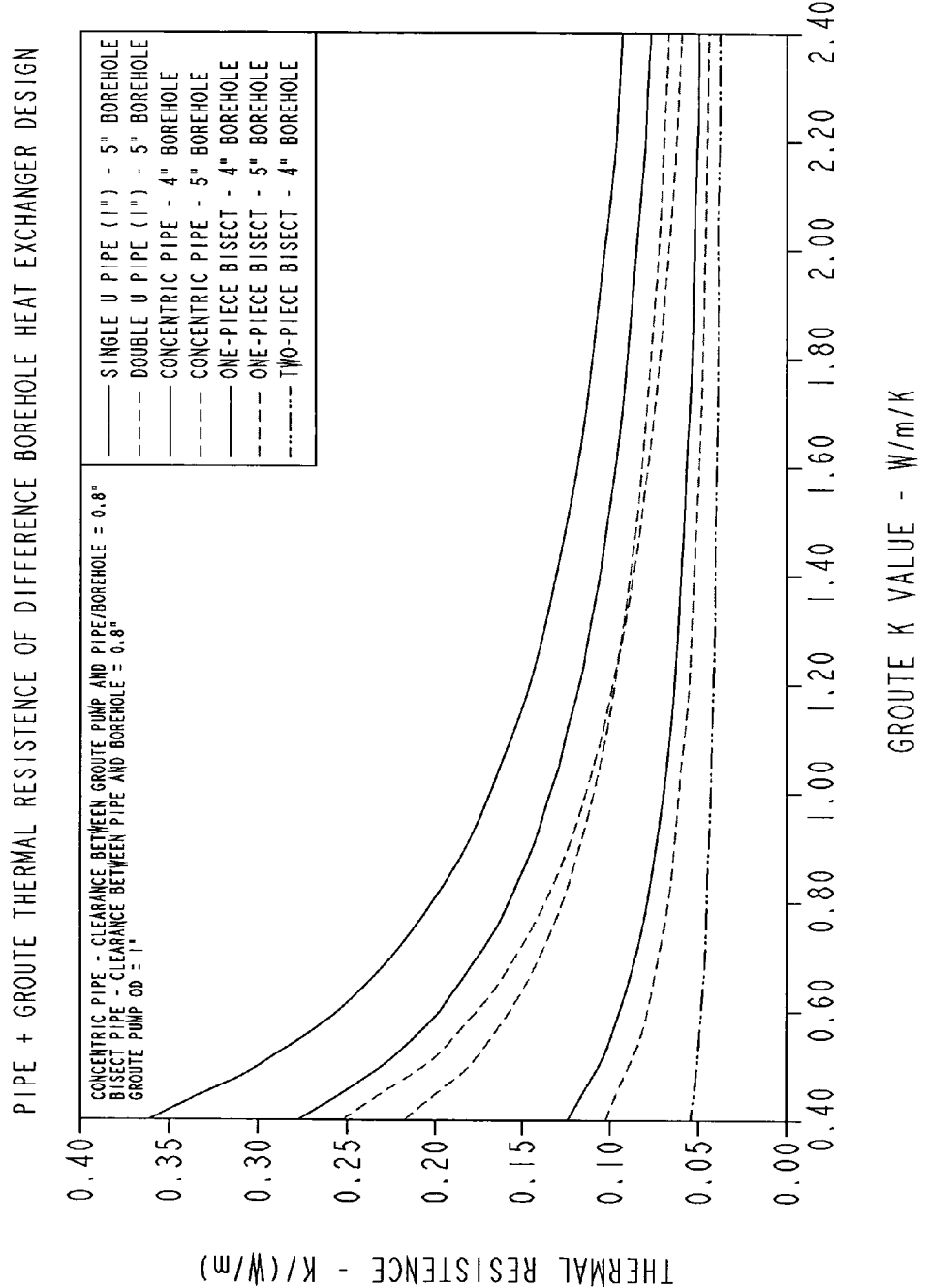
FIG. 18 is a plot of thermal resistance of different heat exchanger designs.
Figure 19:
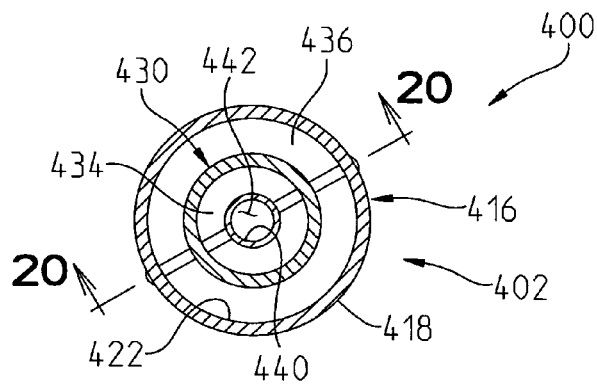
FIG. 19 is a top sectional view of a second alternate embodiment of the pipe system 400 of the present invention showing pipe 402.

Top cap 336 is shown in FIGS. 16 and 17 that is designed for use with pipe 308 and bottom cap 326 of geothermal system 300. The top cap 336 includes an inner cylindrical well 371 having a generally cylindrical interior surface that defines a central passageway 340. Central passageway 340 is sized and positioned for aligning with the central passageway 310 of pipe 308, and for receiving the grout dispensing pipe 322 therein. The grout dispensing pipe 322 can be inserted in the proximal end 337 of passageway 340, and ultimately be moved axially downwardly in passageway 310 of pipe 308, and central passageway 332 of bottom cap member 326. The cap 336 includes a top end 337 and bottom end 338, an inflow chamber 342 and an outflow chamber 344. The cap 336 is designed to fit snugly over proximal end of pipe 308.

The alternate cap 336 also includes an inflow connector port 350 in fluid communication with the inflow chamber 342 and an outflow port connector 352 in fluid communication with the outflow chamber 314. The connector ports 350, 352 allow the system 300 to easily be attached to an existing geothermal system, as the outflow port 350 can be coupled with an inflow pipe 146 and the inflow port 352 can be coupled with an outflow pipe 144. The inflow connector port 352 and outflow connector port 350 extend radially and generally perpendicular to the generally axially extending inflow chamber 344 and outflow chambers 342, and are in fluid communication with the respective inflow chamber 344 and outflow chamber 344. A generally radially extending, diametrally positioned divider well 346 extends between the outer surface 379 of the inner cylindrical wall 371, and the inner surface 381 of the outer cylindrical wall 383. Each of the connector ports 350, 352 fittings include enlarged diameter outer portion 356, 354 respectively for interiorly receiving the respective inflow pipe 146 and outflow pipe 144.

The top cap 336 is sized to be received by the proximal end of the pipe 308, such that central passageway 340 aligns with the central passageway 310 of pipe 308; the inflow passageway 344 aligns with the inflow passageway 314 of the pipe 308; and the outflow passageway 342 aligns with the outflow passageway 316 of the pipe 308. This alignment should be such that the connection between the pipe 308 and the top cap is generally leak-proof, so that the water passageways in the system remain segregated.

It is believed that the preferred method of manufacturing the heat exchanger pipe 308, bottom cap 326 and top cap 336 is by injection molding. Additionally, the heat exchanger pipe is preferably comprised of a plurality of discrete length segments that are joined together to form a complete pipe 308. For example, a completed pipe system 300 for a 100 ft. (30.5 m) bore hole may comprise a bottom end cap 326, a top end cap 336, and 25, four foot (1.2 m) pipe segments 308 that are joined together by bonding to form a pipe system having a total length of about 100 ft. (30.5 m).

Figure 3:
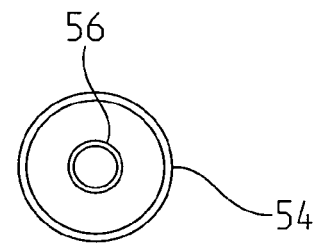
FIG. 3 is a sectional view taken along lines 2-2 of a prior art concentric heat exchange system.

Your attention is now directed to Table 1. Table 1 presents cost comparisons for a hypothetical ten ton cooling capacity geothermal system configuration that compares the various prices and costs associated with installing a side-by-side type geothermal system, such as the one shown in FIG. 1; a concentric geothermal system, such as the type shown in FIGS. 2 and 3; and the multi-chambered pipe system of the present invention. Although it must be understood that the figures given for the multi-chambered pipe of the present invention are estimates, it is believed that these prices should be achievable when and if production of the present invention begins. Additionally, it should be noted that the estimates given are based on typical current pricing as of 2007, but are also subject to variation from contractor to contractor, location, raw material costs, exchange rates, and other factors.

TABLE 1

Materials and Labor Comparison (Estimate) for a Hypothetical 10 Ton Cooling Capacity Configuration (4000 sq. ft. building) excluding costs of lateral pipe and the pump(s)

| Pipe Type | Side-By-Side | Concentric | Multi-Chambered |
|---|---|---|---|
| Pipe Diameter/ Description | 2, 1.25 inch (od) diameter pipes placed side by side, PE HDPE80 | one, 3 inch diameter pipe placed inside one 3 inch diameter pipe, PE | one, 3-chambered pipe. High density polyethylene (BMHDPE e.g. PE-100) |
| Wall Thickness of outer wall | 1/4 inches (0.6 cm) | 3/8 inches (0.9 cm) | 0.167 inches (0.04 cm) |
| Thermal Efficiency | 2 tons/300 ft. (91 m) | 2.5 tons/300 ft. 901 m) | 4 tons/300 ft. (91 m) |
| Cooling Capacity Desired | 10 tons | 10 tons | 10 tons |
| Cost of Pipe per "bored foot" | $1.30/ft. ($4.33/m) | $2.60/ft. ($8.66/m) | $3.50/ft. ($11.55/m) |
| Size of Bore hole Required | 6 inch (15.2 cm) | 4 inch (10.16 cm) | 4 inch (10.16 cm) |
| Cost of Boring per Foot | $8.00 | $6.00 | $6.50 |
| Cost of Installation per foot | $0.40 ($1.33/m) | $0.40 ($1.33/m) | $0.40 ($1.33/m) |
| Total No of Feet of Boring required | 1500 ft. (457 m) | 1200 ft. (304.8 m) | 800 ft. (243.8 m) |
| Boring configuration (x bores each Y ft in length) | 5-300 ft. bores (5-91.4 m bores) | 4-300 ft. bores (4-91.4 m bores) | 2-300 ft. bores (2-91.4 m bores) 1-200 ft. bore (1-60.2 m bore) |
| Total Est. Boring Costs | $12,000.00 | $7,200.00 | $5,200.00 |
| Total pipe costs | $1,475.00 | $2,520.00 | $2,800.00 |
| Total installation costs | $600.00 | $480.00 | $320.00 |
| Total Inclusive Costs of System | $14,075.00 | $10,200.00 | $8,320.00 |

In the present invention, the importance of this table is that it helps to illustrate the cost efficiencies that are likely achievable through the present invention, that make it compare quite favorably to the prior art, and help to attest its inventive nature. Although specific prices are likely to change, it is believed that the relative cost advantages achievable by the present invention will continue to exist.

At the outset it should be noted that the various prices are given for a hypothetical ten ton cooling capacity configuration. This ten ton cooling capacity configuration is of the size and type that one might expect for a geothermal system used in connection with a 4,000 sq. ft. building.

The pipe diameter/description describes the different types of configurations used for the three columns. As alluded to above, the Col. 1, the "side-by-side" configuration is a typical prior art configuration that is shown in FIG. 1 and described above. Column 2 relates to the use of a concentric configuration of the type shown in FIG. 2, wherein a 1.25 (OD) inch diameter inner pipe is placed inside a 3 inch (7.62 cm) diameter outer pipe. The third column presents figures for the present invention and utilizes a three inch diameter multi-chambered pipe.

In the wall thickness row, it will be noted that the wall thickness of the multi-chambered pipe is significantly less than is used in connection with the side-by-side or concentric configurations. As discussed above, this wall thickness helps to promote thermal conductivity, that increases the efficiency of the system. The reduced wall thickness is achieved largely through both the configurations of multi-chambered pipe, that is believed to be inherently stronger than a concentric or side-by-side pipe; and also through the use of the high density polyethylene material that makes the pipe stronger.

It will be noted that the multi-chambered pipe of the present invention has a greater thermal efficiency than any of the side-by-side or concentric configurations. The 4 tons-per-300 ft. thermal efficiency of the multi-chambered device, as illustrated below, enables the user to achieve a predetermined cooling capacity (here, ten tons), with a significantly smaller length of pipe.

It is anticipated that the multi-chambered pipe will have a higher cost per linear foot than the side-by-side configuration, but will have a cost per foot that is generally comparable to the concentric pipe configuration.

Because of its configuration, the multi-chambered pipe requires a smaller bore hole than the side-by-side type, that, as noted in the next row down, results in smaller costs per foot of boring, which, presents a significant savings to the user.

The cost of installation of each of the configurations is generally about the same. The cost of installation includes both the labor and the grouting required to install the geothermal system. The cost savings pay-off of the present invention resides primarily in the fact that its enhanced thermal efficiency will likely require the user to employ a substantially smaller number of feet of pipe, and drill a substantially smaller number of bore hole feet in order to achieve a desired capacity, which here, is a ten ton cooling capacity. It will be noted, for example, that the multi-chambered pipe will likely only require about 800 feet (243.8 m) of boring and pipe to achieve a 10 ton cooling capacity, whereas the concentric configuration will require about 1200 feet (304.8 m) of boring, and the side-by-side configuration will require 1,500 feet (457 m).

This lower number of boring feet translates into a substantial cost savings for the user. It is estimated in this hypothetical example, that the boring costs for the multi-chambered configuration of the present invention would be approximately $4,800.00, which compares very favorably to the $7,200.00 in boring costs required for the concentric configuration and most favorably to the $12,000.00 in boring costs for a side-by-side bores. This smaller number of feet required to bore, also results in lower pipe costs for the multi-chambered pipe, even though the multi-chambered pipe has a higher pipe per-foot cost than a side-by-side pipe.

Additionally, the lower number of boring feet required also reduces the installation costs. Finally, the potential economic advantage achievable with the present invention is most clearly illustrated in the total dollar amount required, as it will be noted that the total exemplary cost for installing the geothermal system of the present invention, to achieve a 10 ton cooling capacity is estimated to be approximately $6,800.00, which is approximately $3,400.00 less than the concentric configuration, which is estimated to be approximately $10,200.00.

The cost of the hypothetical geothermal system described in the table that employs a multi-chambered system has a cost ($6,800.00) which is approximately $7,275.00 less than the cost of the side-by-side system ($14,075.00), thus illustrating the comparative value of the present invention.

Your attention is now directed to FIGS. 19-22 that show a second alternate embodiment geothermal heat exchange system 400. System 400 is similar to the other two embodiments, as its primary components include a geothermal heat exchanger plastic pipe 402, a top cap 404 for placement on the proximal end 412 of the pipe 402; and a bottom cap 408 engagable with and placeable on the distal end 414 of the pipe. The pipe 402, top cap 404 and bottom cap 408 are preferably made from the same high density plastic described above in connection with the other alternate embodiments.

The geothermal system 400 is a concentric system, wherein three pipes are placed concentrically and, preferably co-axially. In this system, the inner most pipe defines the grout containing space. The pipe that is placed concentrically outwardly of the inner most pipe is the divider pipe that divides the inflow passageway from the outflow passageway.

The pipe 402 includes aproximal end 412 and a distal end 414. The pipe 402 also includes an outer wall member 416 having an external surface 418 and an interior surface 422. The interior surface 422 defines an interior passageway 426 through which water can flow, and in which, as will be described later, grout can be placed. A divider 430 is provided which, in the instant case, comprises a generally cylindrical pipe-like wall 430 that is placed concentrically and interiorly of the outer wall 416. As shown in the drawing, the divider wall 430 is also placed coaxially with the outer wall, although it need not be coaxially disposed therewith.

The divider wall 430 divides the interior passageway of the pipe 402 into an inflow passageway 434 and an outflow passageway 436. As with the other embodiments, heat exchanger fluid (usually water) can flow in the inflow passageway 434 from the proximal end 412 to the distal end 414 of the pipe. Water can also flow from the distal end 414 to the proximal end 412 in the outflow passageway 436 as indicated by the arrow shown in connection with the inflow passageway 434 and outflow passageway 436.

A concentrically coaxially disposed inner most pipe 440 is disposed interiorly of the inner divider pipe 430. The inner most pipe 440 separates the grout receiving passageway 442 from the inflow passageway 434. The grout receiving passageway 442 is generally similar in size, shape and configuration to the grout receiving passageway shown in the second alternate embodiment of FIGS. 10-12.

The inner most grout containing pipe 440 also includes one or more lateral passageways 446, that extend radially outwardly from the inner most pipe 440. The lateral passageways include a first end 446 in fluid communication with the interior of the grout receiving passageway 442, and a second end 450 in fluid communication with the external surface 416 of the outer most pipe. Grout can flow through the lateral passageways 446 from the grout receiving passageway 442, to the grout containing space that exists between the external surface 416 of the outer most pipe and the interior wall of the bore hole (not shown).

A bottom cap 408 is shown in FIG. 21 and is capable of being coupled to the distal end 414 of the pipe 402. Preferably, the bottom cap has an outer wall 459 having the same diameter as the outer wall 418 of the pipe 402. As shown in the drawings, the wall 459 can have a rounded bottom. Alternately, it can have a more "squared off" or rounder corner shaped bottom.

The wall 459 includes an upper lip 470 that is sized and positioned to be mated with the distal end of the outer wall 416 of the pipe 402. An inner tube 466 is contained within the interior of the bottom cap 408. The inner wall 460 includes a proximal end 466 that is sized and positioned to mate with the distal end of the inner wall 440 that separates the grout receiving passageway 442 from the inflow passageway 426.

The grout receiving passageway 464 that is defined by the interior surface of the inner wall 460 aligns with the grout receiving passageway 442 of the pipe, so that a grout dispensing pipe can be inserted through the grout receiving passageway 442, and into and through the grout receiving passageway 464 of the bottom cap, so that the distal end of the grout receiving pipe (not shown) can ultimately be placed adjacent to the distal end 464 of the bottom cap 408.

The inner grout receiving pipe 460 defines a torus-shaped fluid passageway 462. When the bottom cap 408 is coupled onto the distal end of pipe 402, the fluid passageway 462 under lays both the inflow passageway 426 and the outflow passageway 436. Through this arrangement, water flowing through the inflow passageway 426 and out the distal end thereof, can flow in the torus-shaped fluid passageway 462, and then upwardly through the distal end opening of the outflow passageway 436, and then up the outflow passageway 436 until the water emerges from the proximal end 412 of the outflow passageway.

A top cap 404 is shown in FIG. 22 as including a proximal end 474 and a distal end 480. The cap 404 includes an outer wall member 478 that is sized, positioned and configured so that the distal end of the outer wall 478 can mate with the proximal end 412 of the outer wall 416 of the pipe.

The top cap also includes a radially extending inflow port 482 that can be coupled to a pipe of the heat exchanger. The radially extending inflow port 482 empties into an axially extending inflow passageway 484. Inflow passageway 484 is sized and positioned to mate with the inflow passageway 434 of the pipe 402. The inflow passageway 484 is defined by a divider wall 490 that divides the inflow passageway 484 from the outflow passageway 498. Divider wall 490 is generally circular in configuration, and is disposed concentrically and coaxially with the outer wall 478.

An inner most wall 492 is disposed concentrically radially inwardly and coaxially with the divider wall 490. The inner most wall 492 divides the inflow passageway 482 from the grout receiving passageway 494. The grout receiving passageway 494 is alignable with the grout receiving passageway 442 of the pipe 402, and is sized also for receiving the grout dispensing pipe (not shown).

An outflow passageway 498 extends axially, and is disposed radially outwardly of the inflow passageway 482. As discussed above, the outflow passageway 498 is separated from the inflow passageway 482 by a divider wall 490, that segregates the water in the inflow passageway 482 from the water in the outflow passageway 498. The outflow passageway 498 terminates in a generally radially extending outflow port 496. The outflow port 496 is sized and positioned for being coupled to a fitting of a geothermal lateral pipe, so that water carried away from the geothermal heat exchanger 400 can be carried to either another geothermal heat exchanger (if multiple geothermal heat exchangers are used), or back into the heat exchanger coil adjacent to the building to be cooled.

Although the invention has been described with reference to certain preferred embodiments, it will appreciated that the invention should not be limited by these preferred embodiments, but rather be construed much more broadly to include other similar structures and configurations within the scope and spirit of the present invention.

What is claimed is:

1. A pipe for use in a geothermal heat exchange system, the pipe being insertable into as bore hole having a proximal end, a distal end and a bore hole wall, the pipe comprising
a multi-chambered pipe having a proximal end, a distal end and a centrally disposed grout receiving passageway, an inflow passageway for conducting heat exchange fluid from the proximal end to the distal end of the pipe, the inflow passageway being disposed radially outwardly of the grout receiving passageway, and an outflow passageway for conducting heat exchange fluid from the distal end to the proximal end of the pipe, the outflow passageway being disposed radially outwardly of the grout receiving passageway;
and at least one laterally extending passageway for conducting grout receiving passageway to travel radially outwardly into a space between the pipe and the bore hole wall.

2. The pipe of claim 1 further comprising a divider for segregating heat exchange fluid in the outflow passageway from heat exchange fluid in the inflow passageway, wherein the divider includes a first divider wall portion and a second divider wall portion.

3. The pipe of claim 2 wherein the first and second divider wall portions define an air space therebetween for reducing heat transfer between the inflow passageway and the outflow passageway.

4. The pipe of claim 3 wherein the divider comprises a diametrally disposed divider that causes the inflow and outflow passageways to have generally equal cross sectional areas.

5. The pipe of claim 3 wherein the divider comprises a chordally disposed divider that causes the inlet and outlet passageways to have differing cross sectional areas.

6. The pipe of claim 1 further comprising a bottom cap capable of being coupled to the distal end of the pipe in fluid communication with each of the inflow passageway and outflow passageway for directing fluid that emerges from the distal end of the inflow passageway into the distal end of the outflow passageway.

7. The pipe of claim 6 further comprising a top cap member capable of being coupled to the proximal end of the pipe, an inflow chamber and an inflow port in fluid communication with the inflow passageway of the pipe, and an outflow chamber and outflow port in fluid communication with the outflow passageway.

8. The pipe of claim 1 further comprising a top cap member for matingly engaging the proximal end of the pipe, an inflow chamber, and an inflow port in fluid communication with the inflow passageway of the pipe, and an outflow chamber of an outflow port in fluid communication with the outflow passageway.

9. The pipe of claim 1 further comprising a divider for segregating heat exchanger fluid in the outflow passageway from heat exchanger fluid in the outflow passageway wherein the divider also defines the centrally disposed grout receiving passageway.

10. The pipe of claim 1 wherein the pipe includes an outer wall, the grout receiving passageway is in fluid communication with the at least one laterally extending passageway, the at least one laterally extending passageway including a first end fluidly coupled to the grout receiving passageway, and a second end coupled to the outer wall, the laterally extending passageway being provided for receiving a grouting material from the grout receiving passageway and delivering the grouting material to a grout receiving space between the outer wall of the pipe and the bore hole.

11. The pipe of claim 1 wherein the at least one lateral extending passageway includes a first end in fluid communication with the grout receiving passageway and a second end in fluid communication with a grout receiving space between the pipe and the bore hole wall wherein the at least one laterally extending passageway extends through at least one of the inflow passageway and the outflow passageway, without being in fluid communication with the at least one of the inflow passageway and outflow passageway.

12. The pipe of claim 11 wherein the at least one laterally extending passageway comprises at least a first and a second opposed lateral passageways, the first and second lateral passageways including second ends disposed at opposed points in the grout receiving space.

13. The pipe of claim 1, wherein the pipe includes an outer wall, and when disposed in a bore hole, the pipe includes an encasement of grout externally encasing the external surface of the outer wall, and isolating the external surface of the outer wall from ground adjacent the bore hole, wherein the grout receiving passageway and at least one lateral passageway include grout therein, and wherein the pipe remains in the bore hole after being encased in grout.

14. The pipe of claim 10 further comprising at least as first and a second laterally extending passageway, the first and second laterally extending passageways each including a first end in fluid communication with the grout receiving passageway, and a second end in fluid communication with the grout receiving space.

15. The pipe of claim 14 wherein the grout receiving passageway and the at least first and second laterally extending passageways are integrally formed as a part of the divider.

16. The pipe of claim 9, wherein the divider is formed integrally with the lateral passageway.

17. The pipe of claim 16 wherein the grout receiving central passageway is formed integrally with the lateral passageway, the inflow passageway and the outflow passageway, and is provided for receiving grout and delivering the received grout externally of the pipe.

18. The pipe of claim 1 wherein the laterally extending passageway includes at least a first and a second laterally extending passageway, each of the first and second laterally extending passageways including a first end in fluid communication with grout receiving passageway and a second end in fluid communication with a grout receiving space disposed externally of the pipe.

19. The pipe of claim 1 further comprising a bottom cap member capable of being coupled to the distal end of the pipe in fluid communication with each of the grout receiving passageway, inflow passageway and outflow passageway of the pipe, wherein the cap includes a wall member for defining the grout receiving passageway of the bottom cap, the wall being matable with a wall of the grout receiving passageway for isolating the grout receiving passageway from the inflow and outflow passageways, the bottom cap including a fluid passageway in communication with each of the inflow passageway of pipe and the outflow passageway of the pipe for directing fluid from the distal end of the inflow passageway to the distal end of the outflow passageway.

20. The pipe of claim 19 wherein the bottom cap includes a torus shaped fluid passageway disposed radially outwardly of and surrounding the grout receiving passageway defining wall of the bottom cap.

21. The pipe of claim 19 further comprising a top cap member capable of being coupled to the proximal end of the pipe, and including a top cap divider sized and positioned to segregate fluid flowing in the inflow passageway, fluid flowing in the outflow passageway and material contained within the grout receiving passageway.

22. A pipe for use in a geothermal heat exchange system, the pipe being insertable into a bore hole having a proximal end, a distal end and a bore hole wall, the pipe comprising,
a pipe having a proximal end, a distal end and an outer wall member, the outer wall member including an external surface, and an interior surface defining an interior passageway through which a heat exchange fluid can flow,
the interior passageway including an inflow passageway for conducting heat exchange fluid from the proximal end to the distal end of the pipe, and an outflow passageway for conducting heat exchange fluid from the distal end to the proximal end of the pipe, and the pipe further including a sealing material receiving passageway disposed interiorly of the outer wall and extending generally from the proximal end to the distal end of the pipe and not in fluid communication with either of the inflow or outflow passageways, and at least two laterally extending passageways for conveying sealing material from the sealing material receiving passageway into a space in the bore hole between the outer wall of the pipe and the bore hole wall.

\* \* \* \* \*